United States Patent [19]

Kossmehl et al.

[11] 4,332,922
[45] Jun. 1, 1982

[54] PROCESS FOR RENDERING SILICONE RUBBER CONTACT LENSES HYDROPHILIC

[75] Inventors: Gerhard Kossmehl; Dietrich Quast, both of Berlin; Horst Schäfer, Aschaffenburg-Obernau, all of Fed. Rep. of Germany

[73] Assignee: Titmus Eurocon, Aschaffenburg, Fed. Rep. of Germany

[21] Appl. No.: 170,256

[22] Filed: Jul. 18, 1980

[51] Int. Cl.$^3$ .................... C08L 43/04; B05D 5/06
[52] U.S. Cl. .................... 525/478; 264/1.4; 351/160 H; 427/2; 427/40; 427/164; 427/169; 427/340; 427/341; 427/387; 427/400; 525/479; 528/14; 528/23; 528/31; 528/32
[58] Field of Search .................... 427/387, 38, 2, 41, 427/40, 164, 169, 399, 400, 337, 340, 336, 341; 351/160 H; 264/1, 1.1, 1.4; 525/478, 479; 204/159.13; 528/23, 31, 32, 33, 37, 14

[56] References Cited

U.S. PATENT DOCUMENTS

| | | |
|---|---|---|
| 3,935,342 | 1/1976 | Lim ................................ 427/341 |
| 4,053,680 | 10/1977 | Wasserman et al. ........... 427/400 X |
| 4,143,949 | 3/1979 | Chen .............................. 351/160 H |
| 4,182,723 | 1/1980 | Covington .................. 351/160 H X |
| 4,189,546 | 2/1980 | Deichert et al. ........... 351/160 H X |

*Primary Examiner*—Norman Morgenstern
*Assistant Examiner*—Thurman K. Page
*Attorney, Agent, or Firm*—Felfe & Lynch

[57] ABSTRACT

Process for rendering silicone rubber contact lenses hydrophilic by first reacting the silicone rubber with an oligomeric siloxane containing SiH groups in the presence of a catalyst and then subjecting the resulting equilibrated silicone rubber to a reaction with an aqueous base; or a silane addition reaction with a reactant containing C=C double bonds.

13 Claims, No Drawings

PROCESS FOR RENDERING SILICONE RUBBER CONTACT LENSES HYDROPHILIC

The invention is a process for rendering silicon rubber contact lenses hydrophilic, by covering the silicon rubber surface with a hydrophilic surface layer.

There are already known methods of rendering contact lenses made of nonhygroscopic silicon rubber hydrophilic, by grafting hydrophilic polymers onto the silicon rubber surface. However, the processes known up to now have the disadvantage that the hydrophilic surface layer thus produced reduces the permeability of the contact lenses to oxygen, and that the hydrophilic contact lens tends to become opaque and contaminated, due to deposits of various substances.

The aim of the inventors was to devise a process of rendering silicon rubber contact lenses hydrophilic, which did not reduce the permeability of the contact lens to oxygen, and did not cause an increased tendency to deposits, despite a high degree of hydrophilia.

The present invention solves the problem in the following way: in the first step of the process, the silicon rubber is converted by means of an oligomeric siloxane containing SiH groups, in the presence of a catalyst (equilibration reaction), and in the second step of the process, the equilibrated silicon rubber undergoes either a reaction with an aqueous base, or a silane addition reaction with C=C double bonds, carried out using compounds containing C=C double bonds.

The newly-invented process renders the contact lens hydrophilic by the following method: in the first step of the process, reactive groups are introduced onto the surface of the silicon rubber by a chemical conversion; in the second step of the process, these then bring about a change in the molecular surface structure, through reaction with various substances; thus, due to the altered composition of the surface of the silicon rubber, its nonhygroscopic character is eliminated. The compounds used in the process are firmly and permanently linked with the silicon rubber by normal chemical bonds, i.e. by principal valency bonds, in such a way that they become structural members of the modified, polymerized silicon material.

One of the greatest advantages of the present invention is that the process renders the silicon rubber hydrophilic, while causing virtually no reduction in its permeability to oxygen, because the hydrophilic layer introduced onto the silicon rubber is extremely thin, many relatively short hydrophilic molecular chains being attached to the silicon rubber surface.

The newly-invented process can be applied both to warm polymerized silicon rubber types, and to cold polymerized silicon rubber types. Warm polymerized silicon rubber types possess no reactive groups which would enable molecules firmly linked by chemical bonds to be attached to the surface, thus rendering the nonhygroscopic silicon rubber hydrophilic. Cold polymerized silicon rubber types, on the other hand, still exhibit slight concentrations of reactive groups, in the form of SiH groups, which can be converted with hydrophilic molecules, to render the surface of the nonhygroscopic silicon rubber hydrophilic. If the newly-invented process is applied to warm polymerized silicon rubber types, reactive groups are introduced in the first step of the process, while if it is applied to cold polymerized silicon rubber types, the quantity of reactive groups is increased.

In the first step of the process, the silicon rubber is converted by means of a low molecular siloxane containing SiH groups, in the presence of a suitable catalyst, in a solvent which is a weak swelling agent for the polymerized silicon rubber, in order to introduce SiH groups onto the surface of the silicon rubber. This reaction is termed an equilibration reaction. In the case of polydimethyl siloxane as silicon rubber, the equilibration reaction proceeds as follows:

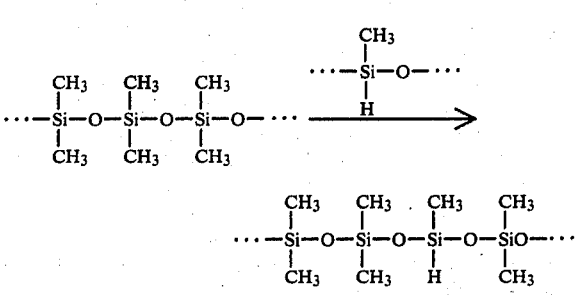

A silicon rubber suitable for this conversion is a polydimethyl siloxane, warm polymerized by, for example, peroxide, or a polydimethyl siloxane cold polymerized at room temperature by a silane-vinyl group reaction; the latter may contain a small quantity of phenyl groups in place of methyl groups.

Suitable reagents for introducing the SiH groups are oligomeric, linear methyl hydrogen siloxanes with 5 to 50 Si atoms in a chain, the most suitable methyl hydrogen siloxane being that with 10 Si atoms, such as, for example, the oil marketed under the trade name "Baysilon Oil MH4".

EXAMPLE 1

Silicon rubber contact lenses made of warm or cold polymerized silicon rubber are stirred for 24 hours at 80° C. in a 30% by weight solution of oligomeric methyl hydrogen siloxane with 10 Si atoms ("Baysilon Oil MH4"), using diethyleneglycoldimethyl ether as the solvent, and 0.5% by weight hexachlorotriphosphasene as the catalyst, then extracted, using the same solvent.

Oligomeric, cyclic methyl hydrogen siloxanes with 3 to 11 Si atoms are also suitable for introducing the SiH groups. The most suitable compounds for this purpose are those containing approximately 7 to 10 Si atoms in a ring, a mixture of which can also be used. For example, the individual cyclic compounds in the mixture are obtained and fractionated in the hydrolysis of methyldichlorosilane.

EXAMPLE 2

Silicon rubber contact lenses made of warm or cold polymerized silicon rubber are stirred for 24 hours at 80° C. in a 10% by weight solution of a mixture of cyclic methyl hydrogen siloxanes with approximately 7 to 10 Si atoms (boiling point at 12 torr=100° to 200° C.), in diethyleneglycoldimethyl ether as the solvent, with 1.5% by weight hexachlorocyclotriphosphasene as the catalyst, then extracted, using the same solvent.

Examinations of the surface of the contact lenses by means of IR spectroscopy have shown that equilibration with a mixture of cyclic heptamers to decamers is more effective than with linear methyl hydrogen siloxane.

Insert solvents, which cause the silicon rubber to swell only slightly, are suitable for the equilibration reaction, for example, diethyleneglycoldimethyl ether. Aromatic carbonic hydrogens, such as toluol, are not suitable.

A catalyst is required to carry out the equilibration reaction. Acids in the real sense, and LEWIS acids, are suitable. Particularly convenient, because they are easily detached and physiologically suitable, are aqueous $H_2SO_4$ in fairly high concentrations (for example, 80%), acid activated bleaching earth and hexachlorocyclotriphosphasene. The latter is the most effective, and is used in concentrations of 0.1 to 4% by weight of the quantity of methyl hydrogen siloxane.

The optimum quantity of catalyst depends on the concentration of the reagent used in the equilibration reaction. For example, a catalyst concentration of 1.5 to 2% by weight, with a solution concentration of 10% by weight or 0.5% by weight in 50% by weight weight solution, is optimum. If these values are increased, gelling takes place. The strongest equilibration was achieved under the latter conditions, i.e. with a 50% by weight solution and 0.5% by weight catalyst.

The most suitable reaction temperature is 100° C. At temperatures below 100° C., the conversion is less strong, while at temperatures above 100° C., the reaction solution begins to gel.

Examinations by means of IR spectroscopy have shown that equilibrated silicon rubber contact lenses exhibit greater quantities of SiH groups than untreated silicon rubber contact lenses made of cold or warm polymerized silicon rubber.

The permeability of the contact lenses to oxygen is not reduced as a result of the equilibration reaction carried out in the first step of the invented process. Their wettability is approximately the same as that of untreated contact lenses.

SiH groups are introduced onto the surface of the silicon rubber by the equlibration reaction. These can now enter into a large number of chemical reactions, producing from the SiH groups other hydrophilic groupings, which are attached to the silicon framework by chemical linkage. For this purpose, in the second step of the invented process, either a reaction with an aqueous base, or a silane addition reaction with compounds containing C=C double bonds, is carried out.

In the reaction with a base, the SiH groups are converted into Si—OH groups, for example by means of alkali metal hydroxide in aqueous solution. In the case of sodium hydroxide in aqueous solution, the reaction proceeds as follows:

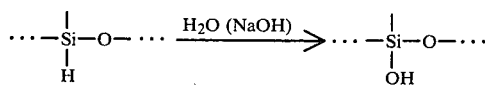

EXAMPLE 3

Equilibrated contact lenses made of cold or warm polymerized silicon rubber are stirred at room temperature for 3 to 12 hours with 10% aqueous NaOH, containing 0.2 parts by volume diethyleneglycoldimethyl ether as dissolving intermediary, then dulcified in the usual way. The development of $H_2$ indicates that the reaction is taking place.

Butanol can also be used as dissolving intermediary.

A reduction in the SiH bands and the appearance of OH bands in the IR spectrum indicates completion of the reaction. The permeability to oxygen of contact lenses rendered hydrophilic in this way is not reduced. Their wettability is increased, however. Measurements of the boundary angle have given values ranging from 37° to 45°.

As an alternative to the reaction with bases, a silane addition reaction with compounds having C=C double bonds, can be carried out (engrafting reaction).

With one group of compounds containing C=C double bonds, the engrafting reaction leads directly to the formation of hydrophilic groupings on the surface of the contact lens. With a second group of compounds having C=C double bonds in a molecule, non-hygroscopic remnants may be found in fairly high quantities after engrafting. An advantageous development of the invention is the third step of the process, in which these remnants are rendered hydrophilic through an esterifying conversion, splitting of the ether or splitting of the ester.

Thus, the contact lenses are rendered hydrophilic in one or two steps, subsequent to the equilibration reaction.

The following are examples of the first group of compounds suitable for the silane addition reaction, which lead directly to the formation of a hydrophilic surface layer: allyl glucose, allyl urea, methacrylic acid-β-trimethylsilylhydroxyethyl ester (here the splitting-off of the trimethyl silyl group takes place when the contact lenses are conditioned in physiological saline solution), β-trimethylsilylhydroxyethylmethacrylic acid amide, methacrylic acid-N-β-aminoethyl-amide, methacrylic acid-2-dimethylaminoethyl ester, N-vinyl-pyrrolidone, N-vinyl-ε-caprolactam, N-methyl-N-vinyl acetamide and vinyl pyridine, and soluble polymers of any of the above compounds.

The following are examples of the second group of compounds suitable for the silane addition reaction, which require a third step to render the contact lenses hydrophilic: allyl glycidyl ether, methacrylic acid glycidyl ester, acrylic acid alkyl ester, methacrylic acid alkyl ester, vinyl acetic acid alkyl ester, allyl acetic acid alkyl ester, allyl malonic acid dialkyl ester, allyl acetate and vinyl acetate, and soluble polymers of the above monomers.

Good wettability, characteristic of hydrogel substances, is achieved through all of these conversions, which may proceed with or without an esterification conversion, splitting of the ether or splitting of the ester.

From among the compounds in the second group mentioned above, the oxirane system in the case of methacrylic acid glycidyl ester can be converted with, for example, triethylene glycol or with other high molecular ethylene glycols (splitting of the ether). In the case of allyl acetate, vinyl acetate and soluble polymers of these substances, splitting of the ester is carried out in the third step of the process.

The ester conversion in the case of the above mentioned alkyl esters is carried out preferably by means of triethylene glycol or high molecular ethylene glycolene.

The silane addition reaction, i.e. the engrafting reaction, proceeds as follows in the case of methacrylic acid methyl ester:

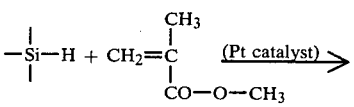

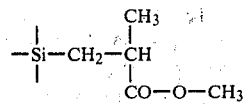

The engrafting reaction proceeds in the same way where polymethylmethacrylate (PMMA), containing C=C double bonds, is used.

EXAMPLE 4

Contact lenses made of equilibrated, cold polymerized silicon rubber are stirred for 3 days at 82° C. with a 1% by weight solution of soluble PMMA, for example the PMMA marketed by Röhm and Haas under the trade name "Plexit 74", in ethyleneglycoldimethyl ether, in the presence of $10^{-7}$ to $10^{-5}$ mol $H_2PtCl_6.6H_2O$ per mol PMMA as the catalyst, and then dulcified in the usual way.

Further tests to establish the optimum conditions showed that reaction times considerably shorter than the 3 days mentioned in Example 4 are possible. Tests were also carried out using 0.1 to 10% by weight solutions of PMMA. The results showed that PMMA concentrations of over 1% by weight can cause the contact lens to become opaque, and are therefore not suitable. Catalyst concentrations of over $10^{-5}$ mol per mol PMMA cause platinum to be precipitated, resulting in tinted lenses. Examinations by means of IR spectroscopy have shown that insoluble PMMA without chemical linkage is deposited on the silicon rubber surface, where treatment with soluble PMMA is carried out without a catalyst. For this reason, it is preferable to use a catalyst.

After the catalysed conversion with soluble PMMA, the IR spectrum of the equilibrated cold polymerized silicon rubber types shows a clear reduction in the SiH bands, together with a considerable increase in the C=O bands, which is characteristic of methacrylate.

The permeability of the contact lenses remains virtually unaffected by the PMMA engrafting reaction, and its wettability is improved over that of untreated silicon rubber lenses. Boundary angles of less than 45° were measured. The boundary angle for the untreated silicon rubber contact lens is 90°, and the boundary angle for PMMA is 52°.

An esterification conversion can be carried out in the third step of the process in the case of silicon rubber contact lenses engrafted with PMMA, to replace the methyl remnants with hydrophilic remnants. This proceeds preferably with triethylene glycol or high molecular ethylene glycolene, by stirring for several hours at room temperature up to 60° C. in the presence of a base catalyst, for example K-tert-butanolate. This reaction proceeds as follows:

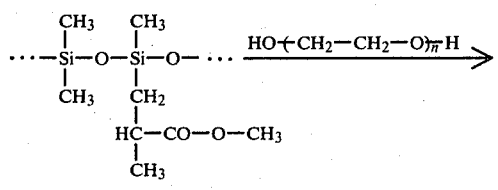

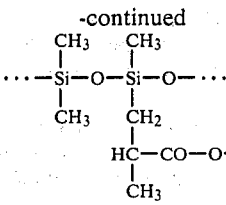

EXAMPLE 5

The contact lenses described in Example 4 above are stirred at 60° C. with a 5% by weight solution of K-tert-butanolate as the catalyst, in triethylene glycol, then dulcified in the usual way.

In the esterification conversion with ethylene glycolene, the nonhygroscopic methyl remnants are replaced by hydrophilic ethylene glycol remnants, resulting in considerably improved wettability and thus a higher degree of hydrophilia. Boundary angles between 10° and 20° were measured. The permeability to oxygen of contact lenses treated in this way exhibits virtually the same values as for untreated silicon rubber lenses.

The contact lenses rendered hydrophilic by this newly-invented process can be submitted to plasma treatment in the generally known way.

It will be understood that the specification and examples are illustrative, but not limitative of the present invention and that other embodiments within the spirit and scope of the invention will suggest themselves to those skilled in the art.

What is claimed is:

1. Process for rendering silicone rubber contact lenses hydrophilic, which process comprises, as a first step, reacting the silicone rubber with an oligomeric siloxane containing SiH groups in the presence of a catalyst and a solvent which is a weak swelling agent for the silicone rubber and, in a second step, subjecting the resulting equilibrated silicone rubber to
   (i) a reaction with an aqueous base in the presence of an alkali metal hydroxide; or
   (ii) a silane addition reaction with a reactant containing C=C double bonds.

2. Process as claimed in claim 1 wherein the reactant used in the first step of the process is an oligomeric linear methyl hydrogen siloxane of 5 to 50 Si atoms in a chain.

3. Process as claimed in claim 1 wherein the reactant used in the first step of the process is an oligomeric linear methyl hydrogen siloxane of 8 to 12 Si atoms in a chain.

4. Process as claimed in claim 1 wherein the reactant used in the first step of the process is an oligomeric linear methyl hydrogen siloxane of 10 Si atoms in a chain.

5. Process as claimed in claim 1 wherein the reactant used in the first step of the process is a mixture of oligomeric linear methyl hydrogen siloxanes of 5 to 50 Si atoms in a chain.

6. Process as claimed in claim 1 wherein the reactant used in the first step of the process is an oligomeric cyclic methyl hydrogen siloxane with 3 to 11 Si atoms in a ring.

7. Process as claimed in claim 1 wherein the reactant used in the first step of the process is an oligomeric cyclic methyl hydrogen siloxane with 6 to 10 Si atoms in a ring.

8. Process as claimed in claim 1 wherein the reactant used in the first step of the process is an oligomeric cyclic methyl hydrogen siloxane with 7 to 10 Si atoms in a ring.

9. Process as claimed in claim 1 wherein the reactant used in the first step of the process is a mixture of oligomeric cyclic methyl hydrogen siloxanes of 3 to 11 Si atoms in a ring.

10. Process as claimed in claim 1 wherein the catalyst used in the said first step is an acid.

11. Process as claimed in claim 10 wherein the catalyst used in the said first step is a Lewis acid.

12. Process as claimed in claim 10 wherein the catalyst used in the said first step is hexachloro-cyclo-triphosphasene.

13. Process as claimed in claim 1 wherein said silane reaction with a reactant containing C=C double bonds step is used, further comprising a subsequent esterifying conversion step.

* * * * *